United States Patent [19]
Ott

[11] Patent Number: 4,484,848
[45] Date of Patent: Nov. 27, 1984

[54] EXPANSION DOWEL ASSEMBLY
[75] Inventor: Johann Ott, Vaduz, Liechtenstein
[73] Assignee: Hilti Aktiengesellschaft
[21] Appl. No.: 381,784
[22] Filed: May 25, 1982
[30] Foreign Application Priority Data
 May 27, 1981 [DE] Fed. Rep. of Germany ....... 3121198
[51] Int. Cl.$^3$ ............................................. F16B 13/06
[52] U.S. Cl. ...................................... 411/24; 411/49; 411/55; 411/61
[58] Field of Search ....................... 411/24, 26, 27, 28, 411/32, 49–53, 55, 57, 60, 61, 65, 70–74

[56] References Cited
U.S. PATENT DOCUMENTS
| | | | |
|---|---|---|---|
| 699,245 | 5/1902 | Russell | 411/61 |
| 3,323,404 | 6/1976 | Fischer | 411/71 |
| 3,662,644 | 5/1972 | Flesch et al. | 411/32 |
| 4,112,813 | 9/1978 | Kuhlmann et al. | |

FOREIGN PATENT DOCUMENTS
| | | | |
|---|---|---|---|
| 3025816 | 2/1982 | Fed. Rep. of Germany | 411/65 |
| 596052 | 7/1959 | Italy | 411/61 |

Primary Examiner—Gary L. Smith
Assistant Examiner—Neill Wilson
Attorney, Agent, or Firm—Toren, McGeady and Stanger

[57] ABSTRACT

An expansion dowel assembly includes an expanding sleeve and a spacer sleeve with a deformable metal sleeve spacer member extending between them. At the outset, the spacer member has a non-circular cross section, however, during the expansion operation, the spacer sleeve telescopes into the spacer member and deforms it outwardly so that it assumes an approximately circular cross sectional shape.

10 Claims, 2 Drawing Figures

EXPANSION DOWEL ASSEMBLY

SUMMARY OF THE INVENTION

The present invention is directed to an expansion dowel assembly including an expansion sleeve, a spacer sleeve and a spacer member extending between the expansion sleeve and the spacer sleeve.

Expansion dowel assemblies of the above type are used to fasten a great variety of objects to structural components and the like. The objects must be secured tightly against the structural component so that it is in full contact with the component.

A known expansion dowel is made up of an expansion sleeve, a spacer sleeve and a tubular spacer member coaxial with and positioned between the two sleeves. An anchor bolt extends through the spacer sleeve, the spacer member and the expansion sleeve and is threaded into a truncated conical expanding member at its end within the expansion sleeve. By turning the anchor bolt the expanding member is pulled into the expansion sleeve causing it to spread radially outwardly. The other end of the anchor bolt extends outwardly from the spacer sleeve and includes a tightening member in the form of a bolt head or a threaded nut.

To anchor the expansion dowel or to fasten an object, the parts forming the dowel assembly are held together by the anchor bolt as a unit which can be pushed through the object to be fastened and into a borehole formed in the structural component to which the object is to be secured. When the assembly is fully inserted into the borehole the tightening member rests directly against the structural component or is separated from it by a gasket. By turning or rotating the tightening member, the expanding member is pulled into the expansion sleeve and the tightening member is supported against the spacer sleeve to supply the required force for drawing the expanding member into the expansion sleeve. As the expanding member moves into the expanding sleeve, the sleeve is widened radially against the surface of the borehole and is secured against sliding movement. To secure the object tightly against the structural component, the spacer sleeve is axially slidable toward the expansion sleeve with the spacer sleeve moving telescopically into the tubular spacer member and causing the spacer member to widen outwardly. This axial movement of the spacer sleeve is necessary to eliminate any possible open spaces between the object and the structural component.

A disadvantage of this particular expansion dowel is the considerable wall thickness of the spacer member needed to provide sufficient stiffness. As a result, large expansion forces are required to widen the spacer member in the radial direction, particularly since widening takes place by bursting the spacer member. The large forces needed for such expansion may, under certain circumstances, lead the operator to assume that further tightening of the tightening member is not possible and thus the fastening procedure is not carried out to completion and the object is not adequately secured to the structural component.

The wall thickness of the spacer member also requires that the wall thickness of the spacer sleeve must be small so that, during the telescopic movement of the spacer sleeve, the spacer member can enter into the annular gap between the anchor bolt and the borehole wall. If the spacer sleeve has a limited thickness, however, its bending resistance is impaired and its capacity to withstand transverse forces is relatively small.

Therefore, it is the primary object of the present invention to provide an expansion dowel assembly capable of taking up any open spaces by a definite and small expenditure of force. Moreover, such an assembly can withstand large transverse forces.

In accordance with the present invention, the spacer member is formed as a metal sleeve which can be expanded radially outwardly or in the circumferential direction. In its original or first state, where it provides a support for the spacer sleeve, it has a transverse cross section which is non-circular and does not project outwardly beyond the outside surface of the spacer sleeve. When the spacer member is stretched or deformed outwardly it can assume a circular shape with an inside diameter corresponding at least to the outside diameter of the spacer sleeve.

The wall of the metal sleeve forming the spacer member in the plane perpendicular to the axial direction of the sleeve, in its original or first state, has a non-circular configuration, that is, in the circumferential direction the surface of the sleeve follows a zig-zag path alternately moving closer to and then further away from the center or axis of the sleeve. Such zig-zag configuration can be provided by a polygonal configuration, by a corrugated configuration, or by a star-shaped configuration which are located within an encircling ring.

In a preferred embodiment, with the spacer member having a star-shaped configuration, the points located closest to the axis of the member are located along an inscribed circle and the points located most remote from the axis are located along a circumscribed circle with the two circles defining the radially inner and outer surfaces of a circular ring within which the metal sleeve spacer member is located.

Due to such a star-shaped configuration, with its zig-zag arrangement, corrugation-like reinforcements are formed extending parallel to the axis of the sleeve. These corrugation-like reinforcements afford a high degree of stiffness to the metal sleeve even though it has a small wall thickness. Consequently, the metal sleeve is capable of absorbing axial stresses developed during insertion of the expansion dowel assembly into a receiving borehole or during the spreading or expanding process and the metal sleeve does not bend.

As the spreading process proceeds, the distance between the spacer sleeve and the expansion sleeve is reduced to eliminate any open spaces, as explained above. To achieve this end, the spacer sleeve telescopes into the metal sleeve spacer member. This telescoping action takes place under a defined and small expenditure of force, because the configuration of the metal sleeve permits a slight widening action. In the widened or outwardly deformed state, the non-circular configuration of the metal sleeve wall is changed into a classical cylindrical shape.

In accordance with the present invention, the metal sleeve can have a thin wall and the spacer sleeve can be dimensioned without any significant loss in cross-section. The annular space between the spacer sleeve and the receiving borehole can take up the outwardly deformed or stretched thin-walled metal sleeve. Since the spacer sleeve has a relatively thick wall, it can absorb great transverse forces.

To achieve the ideal degree of expandability of the metal sleeve, the diameter of the circle circumscribing the sleeve is smaller than the outside diameter of the spacer sleeve. In this way it is possible to ensure that during the insertion of the expansion dowel assembly into a receiving borehole, the metal sleeve spacer member does not interfere with the insertion process by jamming. The circumferential length of the inside surface of the metal sleeve spacer member in a plane perpendicular to its axis, is advantageously slightly larger than the outside circumference of the spacer sleeve. As a result, it is assured that the widening or outward deformation of the metal sleeve takes place exclusively within the region afforded by the transverse cross sectional shape of the borehole. Accordingly, over expansion of the metal sleeve does not occur, that is, tearing or bursting of the sleeve is avoided.

To facilitate the initial movement of the spacer sleeve into the metal sleeve spacer member, the end of the spacer sleeve adjacent to the spacer member has an inwardly tapering configuration and extends into the end of the spacer member. The coaxial alignment of these parts, necessary for a problem-free movement of the spacer sleeve into the spacer member, is simplified, in accordance with the present invention, by providing the end of the metal sleeve spacer member adjoining the spacer sleeve with an inside contour converging inwardly in the direction toward the expansion sleeve.

Preferably, the converging inner configuration of the metal sleeve terminates in a shoulder extending normally to the axis of the sleeve. The force capacity of this shoulder is controllable so that the spacer sleeve can be supported on the shoulder during the insertion of the dowel assembly into a receiving borehole and also during the initial phase of the expansion process. Only as the expansion process proceeds is it important to eliminate any open spaces between the object being fastened and the structural component and when the expansion force exceeds the force capacity of the shoulder, the spacer sleeve commences its movement toward the expansion sleeve telescoping into the metal sleeve spacer member and causing it to widen or deform outwardly.

It is advantageous that the metal sleeve spacer member, during the expansion process, secures the expansion sleeve against rotation in the receiving borehole and, in addition, affords axial support for the dowel assembly in the borehole. During the placement of the dowel assembly into a ceiling, for instance, the metal sleeve prevents the assembly from dropping out of the borehole. Advantageously, the metal sleeve has stop cams for the expansion sleeve and yieldable stop lugs which project radially outwardly beyond the outside surface of the expansion sleeve to secure it against rotation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
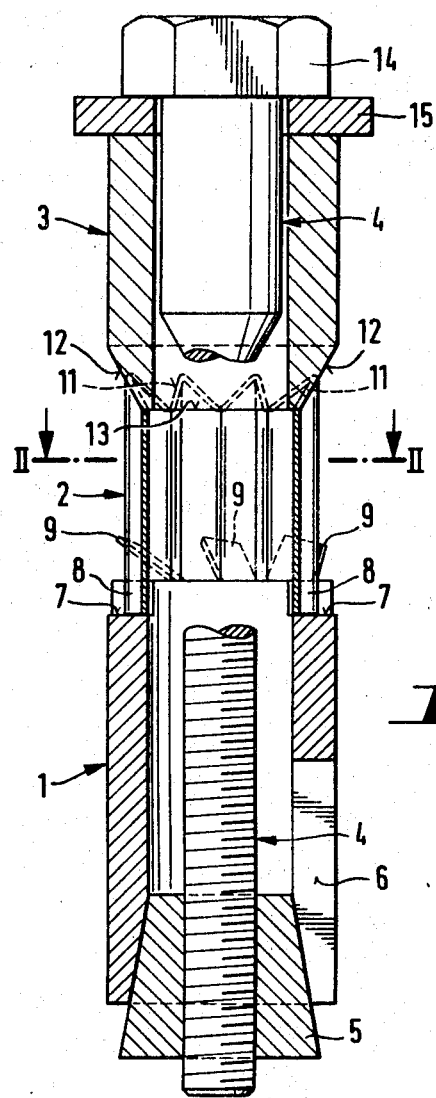
FIG. 1 is an axially extending sectional view of an expansion dowel assembly embodying the present invention and illustrated in its first or unexpanded state.

An expansion dowel assembly is shown in FIG. 1 and consists of an expansion sleeve 1, a metal sleeve spacer member 2, a spacer sleeve 3, an axially extending anchor bolt 4 extending through the sleeves and the spacer member and shown interrupted in the range of the spacer member, and an expansion member 5 positioned at the lower or leading end of the assembly and threaded onto the threaded end of the bolt so that it can be pulled inwardly into the expansion sleeve 1 when the anchor bolt is tightened. The expansion member 5 has a frusto-conical shape in engagement with a corresponding frusto-conical surface at the leading end of the expansion sleeve 1.

To facilitate the radial expansion or widening of the expansion sleeve 1, one or a number of axially extending slots 6 are formed in the sleeve extending from its leading end toward the trailing end for a portion of its axial length. In addition, the trailing end face of the expansion sleeve 1 has a pair of diametrically opposite recesses 7 which provide non-rotating engagement with the metal sleeve 2.

Figure 2:
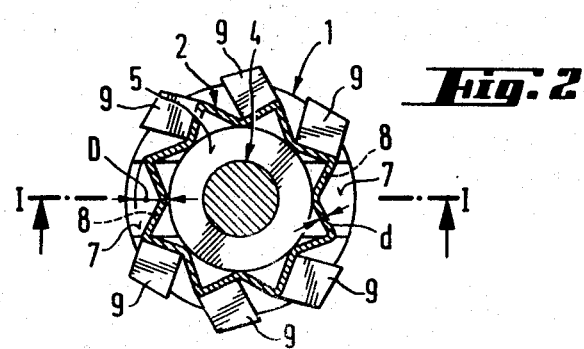
FIG. 2 a cross sectional view taken along the line II—II in FIG. 1.

As viewed in FIG. 2, the metal sleeve spacer member 2 in a plane normal to its axis, has its wall extending circumferentially in a zig-zag shape or in the form of an eight-point star. Because of its hollow configuration, the metal sleeve 2 has outwardly directed points and inwardly directed points. The inwardly directed points closer to the axis of the sleeve are located along an inscribed circle while the outwardly directed points are located along a circumscribed circle. The space between these two circles defines a circular ring with a thickness or radial dimension D considerably greater than the wall thickness d of the metal sleeve 2.

At its leading end, the metal sleeve 2 has axially projecting stop cams 8 extending into the recesses 7 in the expansion sleeve 1 so that the metal sleeve spacer member is engaged with the expansion sleeve whereby there can be no relative rotation between them. Stop cams 8 extend in a formlocking manner into the recesses 7 in the expansion sleeve 1.

As can be seen in FIG. 2 between the diametrically opposite stop cams 8, radially yieldable stop lugs 9 project outwardly beyond the outer surface of the expansion sleeve. As viewed in FIG. 1, the stop lugs 9 extend outwardly from the leading end of the spacer member toward its trailing end.

To facilitate the movement of the leading end of the spacer sleeve 3 into the trailing end of the metal sleeve spacer member 2 while the dowel is being expanded, the trailing end of the metal sleeve is provided with an inwardly tapering contour 11 with the inside surface tapering inwardly in the direction toward the leading end of the sleeve. A correspondingly tapering part 12 is provided on the leading end of the spacer sleeve 3 so that the part 12 fits into the inner contour 11.

Premature movement of the spacer sleeve 3 into the metal sleeve 2 is prevented by a shoulder 13 at the end of the inner contour 11 within the metal sleeve. The shoulder extends transversely of the axis of the sleeve and provides a support for the leading end face of the spacer sleeve 3, that is, the narrow end of the tapering part 12. As initially assembled, the leading end of the spacer sleeve 3 rests against the shoulder 13 preventing the spacer sleeve from entering further into the metal sleeve 2.

To secure the expansion dowel assembly within a borehole or similar opening, the assembly is inserted, as shown in FIG. 1, through an object, not shown, to be fastened to a structural component, into a receiving borehole in the component. Because they extend from the metal sleeve 2 in the trailing direction, the stop lugs 9 contact the surface of the borehole, when the assembly is inserted, with a certain tension action and thereby provide a temporary support or holding action securing the assembly in the borehole against axial displacement and also against rotation.

By engaging a tool on the tightening member or bolt head 14, the anchor bolt 4 can be turned or rotated so that it is threaded through the expansion member 5 causing the expansion member to move inwardly into the expansion sleeve 1. During the rotation of the bolt head 14, depending on the amount of force to be applied to move the expansion member 5 inwardly, the bolt head is supported via gasket 15 on the trailing end of the spacer sleeve 3. As the expansion member 5 is pulled into the expansion sleeve 1 by the anchor bolt 4, the expansion sleeve expands or spreads radially and becomes fixed in the borehole. As the expansion sleeve becomes more tightly fixed in the borehole, the force required to pull the expansion member into the sleeve increases considerably. When the force for moving the expansion member 5 inwardly exceeds the force capacity of the shoulder 13, the spacer sleeve starts to slide forwardly in the direction of the leading end of the assembly and moves into the metal sleeve 2. The movement of the spacer sleeve 3 relative to the metal sleeve 2 causes the metal sleeve to deform radially outwardly so that it is stretched or expanded in the circumferential direction.

As the metal sleeve 2 is stretched by the telescoping movement of the spacer sleeve 3, it assumes a circular cross sectional shape and after the tapering part 12 has passed the shoulder 13 it commences to contribute to the outside diameter of the spacer sleeve 3 by an amount twice the wall thickness d of the metal sleeve. As the spacer sleeve 3 telescopes into the metal sleeve spacer member 2, any open spaces between the object being secured and the structural component are eliminated so that there is a full contact of the object with the structural component.

While specific embodiments of the invention have been shown and described in detail to illustrate the application of the inventive principles, it will be understood that the invention may be embodied otherwise without departing from such principles.

I claim:

1. An expansion dowel assembly having a leading end and a trailing end with the leading end arranged to be inserted into a borehole or opening, comprising an expansion sleeve extending axially from the leading end toward the trailing end, a spacer sleeve extending axially from the trailing end toward the leading end, and a spacer member extending axially between the adjacent ends of said expansion sleeve and spacer sleeve, wherein the improvement comprises that said spacer member is a metal sleeve deformable radially outwardly from a first state to a second state, in the first state said metal sleeve having a transverse cross sectional shape different from a circular shape with the outside surface of said metal sleeve located within the projection of the outside surface of said spacer sleeve and the inside surface of said metal sleeve located radially inwardly of the outside surface of said spacer sleeve, and in the second state said metal sleeve being deformable radially outwardly into an approximately circular transverse cross sectional shape with the inside surface thereof having an inside diameter corresponding at least to the outside diameter of said spacer sleeve.

2. An expansion dowel assembly, as set forth in claim 1, wherein said metal sleeve in the first state has a polygonally shaped configuration with axially extending individual wall sections thereof extending in a zig-zag arrangement relative to the axis of said metal sleeve, and said wall sections located within a circumscribed circular ring.

3. An expansion dowel assembly, as set forth in claim 2, wherein said metal sleeve has the shape in transverse section of a multi-point hollow star.

4. An expansion dowel assembly, as set forth in claims 1, 2 or 3, wherein the axially extending end part of said spacer sleeve closer to the leading end of the dowel assembly has an outer surface tapering inwardly in the direction toward the leading end and said inwardly tapering surface fits into the end of said metal sleeve spacer member.

5. An expansion dowel assembly, as set forth in claim 4, wherein the end of said metal sleeve closer to the trailing end of the dowel assembly has a tapering inside surface diverging toward the trailing end and arranged to receive the tapering end part of said metal sleeve.

6. An expansion dowel assembly, as set forth in claim 5, wherein the tapering inside surface of said metal sleeve at the smaller diameter end thereof forms a radially inwardly projecting shoulder extending perpendicularly of the axis of said metal sleeve so that said shoulder projects inwardly toward the axis of said metal sleeve.

7. An expansion dowel assembly, as set forth in claims 1, 2 or 3, wherein the end of said metal sleeve closer to the leading end of the dowel assembly has angularly spaced axially extending stop cams extending from said metal sleeve toward the leading end of the dowel assembly, and stop lugs attached to the end of said metal sleeve closer to the leading end of the dowel assembly with the lugs projecting outwardly beyond the axial projection of the outside surface of said expansion sleeve and said stop lugs being radially yieldable and arranged to secure the dowel assembly within a borehole against rotation and axial displacement.

8. An expansion dowel assembly, as set forth in claim 7, wherein said stop lugs project from the end of said metal sleeve closer to said leading end of the dowel assembly and extend generally in the direction toward the trailing end of the dowel assembly.

9. An expansion dowel assembly, as set forth in claim 7, wherein the end face of said expansion sleeve closer to the trailing end of the dowel assembly has recesses therein extending toward the leading end of said dowel assembly, and said stop cams on said metal sleeve arranged to extend into said recesses in said expansion sleeve.

10. An expansion dowel assembly, as set forth in claim 1, wherein said expansion sleeve and spacer sleeve have a cylindrically shaped outside surface and said metal sleeve spacer member has a star-shaped outside surface with the circle circumscribing the outside surface of said metal sleeve spacer member having a smaller diameter than the diameter of said expansion sleeve and the outside diameter of said spacer sleeve.

* * * * *